United States Patent

[11] 3,579,857

[72] Inventor  Jack L. Lamberson
             Miami, Fla. (1200 Missouri St., Apt. 609, Baytown, Texas, 77520)
[21] Appl. No. 863,430
[22] Filed     Oct. 3, 1969
[45] Patented  May 25, 1971

[54] ELECTRIC TEACHING DEVICE
     7 Claims, 7 Drawing Figs.
[52] U.S. Cl. .................................................. 35/9
[51] Int. Cl. .................................................. G09b 7/00
[50] Field of Search .................................... 35/9, 48

[56]                References Cited
                UNITED STATES PATENTS
3,106,027  10/1963  Thelen .......................... 35/9
3,187,443   6/1965  Schure et al. .................. 35/9

OTHER REFERENCES
IBM Technical Disclosure Bulletin Vol. 10, No. 9, Feb. 1968 " Paper Forms And Fixture For Self-Scoring Tests," Page 1368, Available in A.U. 336 35/48

Primary Examiner—Wm. H. Grieb
Attorney—Lloyd J. Andres

ABSTRACT: An electric device in which a selected teaching sheet is inserted and registered thereon. The sheet has printed thereon a number of different characters. A network of circuit closing conductors are positioned in the device under the sheet and covered by a resilient member having openings therein corresponding in position to each character. Each sheet has a conducting area on the opposite side of certain selected characters. The student is asked to press a finger directly on one of the selected characters. When correctly pressed, the circuit connected to the network will energize a lamp and buzzer.

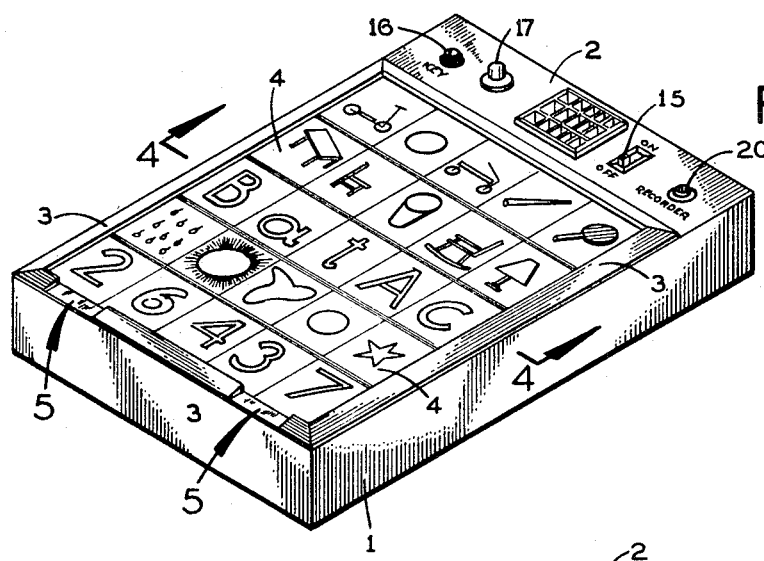
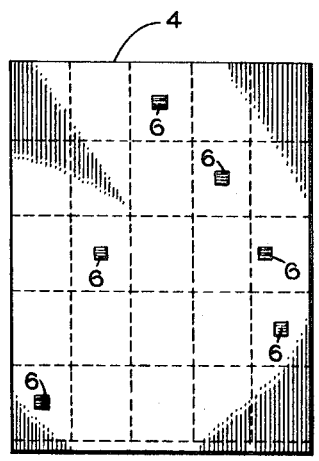
FIG. 3
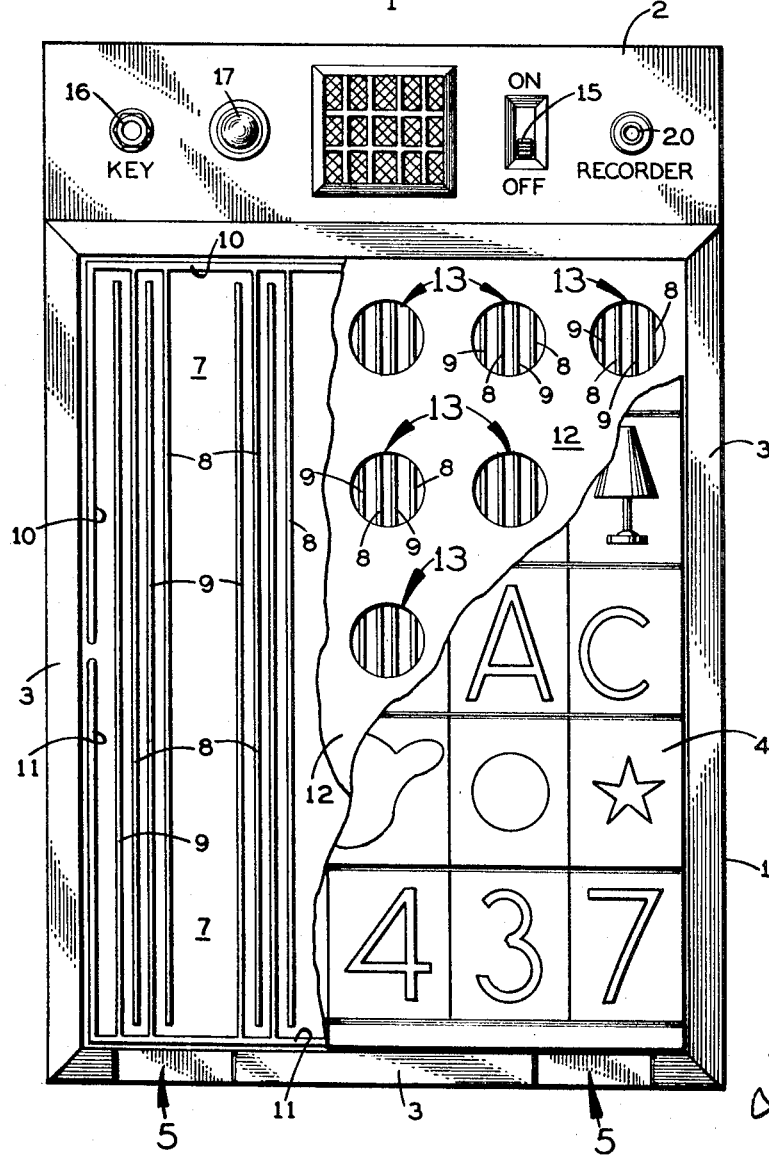
FIG. 2
INVENTOR.
JACK L. LAMBERSON

PATENTED MAY 25 1971 3,579,857
SHEET 2 OF 2
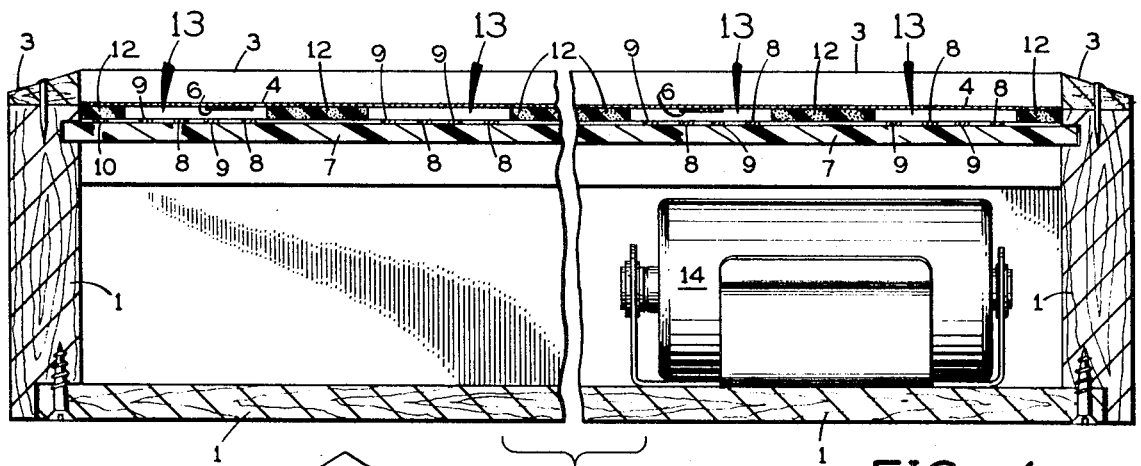
FIG. 4
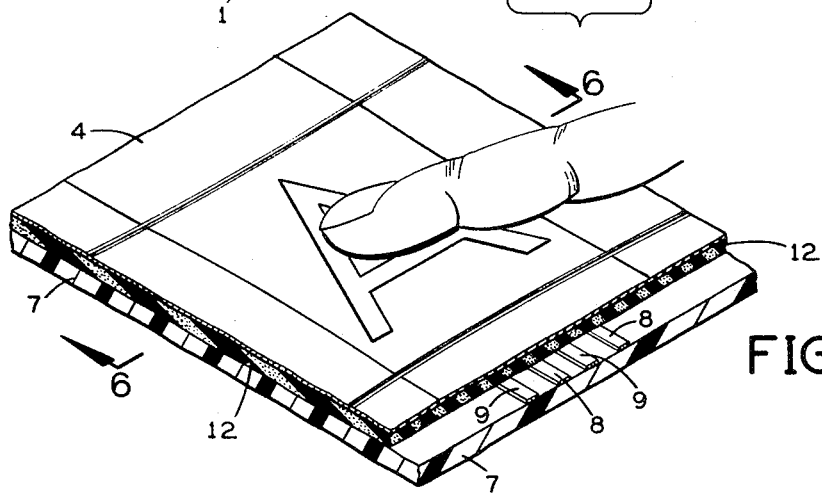
FIG. 5
FIG. 6
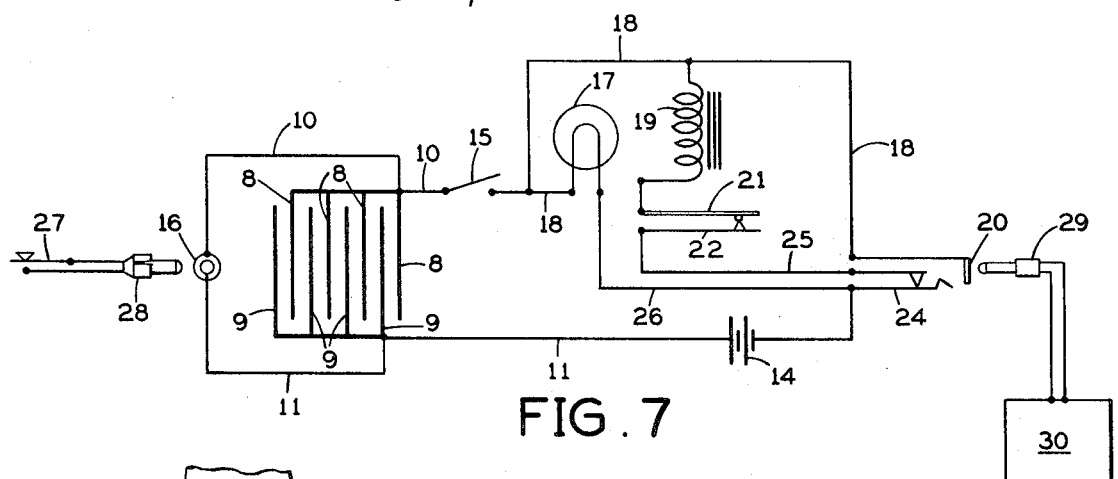
FIG. 7
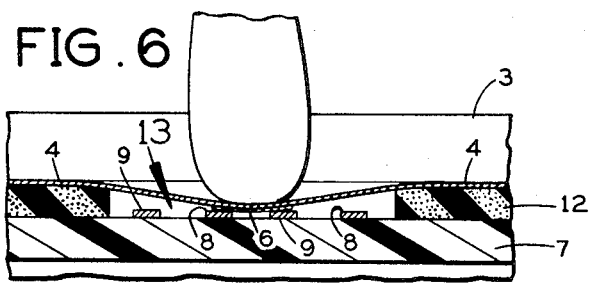
INVENTOR.
JACK L. LAMBERSON
BY
*Lloyd Johnson*

ELECTRIC TEACHING DEVICE

This invention relates in general to teaching devices and more particularly to a device in which the student is asked to identify a particular character or symbol or illustration by placing his finger on a replaceable instruction sheet in the machine which bears a plurality of different printed symbols, etc. If the student places the finger on the proper symbol, an electric circuit will be completed and a lamp will light and a buzzer will sound.

Prior to this invention, similar teaching devices required the use of a manually operated probe, or other switching devices, for making the response to a request of the instructor, which involved excessive complication, frequent errors, and resulted in frequent breakdown of both probe, probe conductors, and the instruction sheet on the device.

A principal object of the present invention is the provision of a device for receiving a selected one of a plurality of instruction sheets on which a plurality of characters and symbols are printed and a selected few of the characters or symbols thereon are electrically responsive to direct finger pressure for energizing an electric visual and audio response when the student has correctly responded to the request.

A further object of the invention is the provision of an electric teaching device having interspaced circuit closing grid boards over which is placed a resilient sheet having orderly perforations therethrough exposing portions of the circuit closing grid for contact by a predetermined number of conductors on the under side of an instruction sheet corresponding to the printed upper side of the instruction sheet when each said selected symbol is finger depressed on the symbol requested for energizing a visual and audio signal.

These and other objects and advantages in one embodiment of the invention are described and shown in the following specification and drawings, in which:

FIG. 1 is a perspective view in reduced scale of the teaching device.

FIG. 2 is an enlarged fragmentary plan view of the device shown in FIG. 1.

FIG. 3 is a plan view of the underside of the upper element shown in FIGS. 1 and 2.

FIG. 4 is an enlarged cross-sectional view taken through section line 4—4, FIG. 1.

FIG. 5 is a perspective enlarged fragmentary view of elements shown in FIG. 1, as operated.

FIG. 6 is an enlarged fragmentary cross-sectional view taken through section line 6—6, FIG. 5.

FIG. 7 is a schematic wiring diagram of the device.

Referring to FIG. 1, a casing 1 has an electric component compartment in the upper rear end thereof, not shown. A control panel 2 in the upper side of casing 1 is provided with a rectangular frame 3 around the upper edge of the casing for forming a compartment into which a printed paper sheet or a flexible card 4 is registered within frame 3 and on which is printed a plurality of numerals, letters, illustrated articles and symbolic data.

The frame has recesses 5 in one end thereof for convenient removal of the sheet from the casing by the fingers. FIG. 3 illustrates the reverse side of a sheet 4 on which certain predetermined rectangles corresponding to selected printed symbols on the opposite side are provided with thin rectangular electric conductors 6, which may be applied by conducting ink or lacquer or by applying a thin metal foil with an adhesive. A planar dielectric panel 7 of uniform thickness is secured as a cover to the casing 1 a predetermined distance below the frame 3, best shown in FIG. 4.

Alternately interspaced circuit closing grids 8 and 9 are printed or etched from copper by well known means on the upper surface of the panel 7, as shown in FIGS. 2 and 6.

It is apparent from FIG. 4 that there are four grid conductors 8 in intersticed parallel relation to four grid conductors 9 with grid conductors 8 terminating in a common connecting conductor 10 and grid conductors 9 terminating in a conductor 11.

Referring to FIGS. 2 and 4, a resilient sheet or pad 12, made of a foam elastomer of highly compressible plastic material, is provided with a plurality of holes 13, best shown in FIG. 2, which are positioned in equispaced rows to correspond with the printed letters, numerals, symbols and illustrations on instruction sheet 4 which is registered and retained within the borders of frame 3. It is now apparent that when a finger is pressed upon any one of the symbols printed on instruction sheet 4, as illustrated in FIG. 5, the paper will be depressed a small distance into the holes 13 in pad 12 and bridge a pair of grid conductors 8 and 9 to close an electric circuit to be hereinafter described.

Referring to FIG. 7, the grid conductors 9 are connected to conductor 11 and the positive terminal of battery 14 and the center terminal of socket 16. The grid conductors 8 are connected to conductor 10 and the outer terminal of socket 16 and one terminal of the on-off switch 15. The remaining terminal of switch 15 is connected to one terminal of lamp 17 by a conductor 18, and one terminal of the buzzer coil 19 and the sleeve terminal of jack 20. The armature 21 of the buzzer is connected to the remaining terminal of the coil 19. The buzzer contact blade 22 is connected to the circuit breaking blade 23 of the jack 20 by a conductor 25. The remaining terminal of lamp 17 and the remaining terminal of battery 14 is connected to the tip blade 24 of the jack 20.

A telegraph key 27 is connected by a pair of conductors to a plug 28 for insertion in socket 16 for intermittently energizing the lamp 17 and the buzzer coil 19.

A plug 29 is connected by a pair of conductors to one of a selected type of several recorders 30 for recording the intermittent closure of grid conductors 8 and 9.

In operation, it is apparent that in the event a student is requested to press a symbol, such as "7" on the instruction sheet, which symbol has a conductor 6 on the opposite side thereof, a circuit will be closed between a pair of adjacent grid conductors 8 and 9 which will simultaneously energize both the buzzer 22 and the lamp 24 by completion of a circuit to battery 14 when the switch 15 is in its "on" position.

It is also apparent that if a student makes a mistake and presses a character that does not have a conductor 6 on the rear side of the sheet then there will be no response from the lamp or buzzer. Obviously the instructor will ask the student to press only those symbols known to have a conductor on the rear side thereof.

When the plug 28 is connected to socket 16 then the telegraph key 27 may be used to operate the device for Morse code practice by the resulting intermittent operation of both the lamp and buzzer.

When the plug 29 is inserted in the jack 20, the blade 24 will break its contact with blade 23 and disable the buzzer circuit only. Then if any of the grid conductors 8 or 9 are closed, the resultant intermittent signals will energize the lamp 17 and simultaneously be impressed on a digital electric counter or a tape recorder equipped with relay operation.

This invention comprehends modifications in construction within the teaching and scope of the above specification.

Having described my invention,

I claim:

1. A teaching device comprising:

a means forming a casing;

a planar rectangular dielectric panel secured in said casing with an upstanding guide means on said casing at each side of said panel for registering a removable instruction sheet over said panel;

a first plurality of electric grid conductors secured in spaced relation on the upper surface of said panel terminating in a first circuit closing conductor;

a second plurality of spaced electric grid conductors secured on the said upper surface of said panel in intersticed relation with said first plurality of conductors and terminating in a second circuit closing conductor;

a compressible elastomer pad of substantially uniform thickness having a plurality of holes therethrough spaced in uniform formation registered on said panel by said guide means with each of said holes positioned over at least one of each adjacent said first and second grid conductor;

an electric lamp secured in said casing;

an electric audible signal means secured in said casing;

a source of electric energy;

a circuit means connecting said first and second circuit closing conductor and said lamp and said signal means to said source of electric energy;

said instruction sheet having a plurality of different printed symbols on one side thereof in corresponding position with the said holes in said elastomer sheet; and a subplurality of said symbols having an electric bridging conductor on the opposite side of said sheet registered therewith forming a subplurality of conducting symbols with each said sheet manually placed in register within said guide means on said elastomer pad whereby finger pressure on any selected one of said subplurality of symbols will overcome the restraining action of said elastomer pad and permit said bridging conductor to bridge said first and second conductors and energize said circuit means and said lamp and said signal means.

2. The construction recited in claim 1 including a circuit closing jack means connected in said circuit normally completing a circuit to said audible signal means; and a jack plug connected to a recording means whereby said plug is inserted in said jack means for opening the said circuit to said audible signal means and energize said lamp and said recording means when said first and second grid conductors are bridged by each said bridging conductors.

3. A teaching device comprising:

a means forming a casing;

a planar rectangular dielectric panel secured in said casing with an upstanding guide means on said casing at each side of said panel for registering a removable instruction sheet over said panel;

a first plurality of electric grid conductors secured in spaced relation on the upper surface of said panel terminating in a first circuit closing conductor;

a second plurality of spaced electric grid conductors secured on the said upper surface of said panel in intersticed relation with said first plurality of conductors and terminating in a second circuit closing conductor;

a compressible elastomer pad of substantially uniform thickness having a plurality of holes therethrough spaced in uniform formation registered on said panel by said guide means with each of said holes positioned over at least one of each adjacent said first and second grid conductor;

an electric audible signal means secured in said casing;

a source of electric energy;

a circuit means connecting said first and second circuit closing conductor and said signal means to said source of electric energy; said instruction sheet having a plurality of different printed symbols on one side thereof in corresponding position with the said holes in said elastomer sheet; and a subplurality of said symbols having an electric bridging conductor on the opposite side of said sheet registered therewith forming a subplurality of conducting symbols with said sheet manually placed in register within said guide means on said elastomer pad whereby finger pressure on any selected one of said subplurality of symbols will overcome the restraining action of said elastomer pad and permit said bridging conductor to bridge said first and second conductors and energize said circuit means and said signal means.

4. In a teaching device of the character described:

a means forming a casing;

a planar dielectric panel secured in said casing;

guide means on said casing for registering the edges of a removable instruction sheet over said panel;

a first plurality of electric grid conductors secured in spaced relation on the upper surface of said panel terminating in a first circuit closing conductor;

a second plurality of electric grid conductors secured on the said upper surface of said panel in spaced relation and intersticed with and spaced from said first plurality of conductors and terminating in a second circuit closing conductor;

a compressible elastomer pad of substantially uniform thickness having a plurality of holes of predetermined size therethrough in a uniform formation registered on said panel by said guide means with each of said holes positioned over a portion of each said first and second grid conductors;

a flexible instruction sheet having a plurality of different printed symbols on one side thereof registered with said holes in said elastomer pad when said instruction sheet is registered thereon by said guide means; and a bridging conductor on the opposite side of said instruction sheet corresponding to and registered with a corresponding predetermined subplurality of said symbols whereby each of said subplurality of symbols may be finger pressed to compress said elastomer pad and move said bridging conductor into contact with said first and second electric conductors for closing a normally open circuit connected to said first and second circuit closing conductor.

5. The construction recited in claim 4 wherein said plurality of symbols is a predetermined mixture of characters and illustrations.

6. In a teaching device of the character described:

a dielectric panel having a planar upper surface and predetermined outside dimensions;

a first plurality of contact conductors secured in spaced relation on said upper surface of said panel terminating in a first circuit closing conductor;

a second plurality of contact conductors secured to said upper surface of said panel positioned in intersticed relation with said first contact conductors and terminating in a second circuit closing conductor;

a compressible pad of plastic foam material of substantially uniform thickness in a predetermined registered position on said panel having a plurality of spaced holes therethrough in a predetermined formation with each of said holes exposing a portion of adjacent first and second contact conductors;

a flexible instruction sheet having a plurality of different symbols thereon positioned on the upper side thereof in said predetermined formation with each of said symbols over each of said holes in said pad and normally spaced from said contact conductors; and a bridging conductor on the rear side of said sheet opposite each of a predetermined subplurality of said symbols whereby finger pressure on each of said subplurality of symbols will flex said sheet and compress said pad and bridge said first and second contact conductors with said bridging conductor and close an electric circuit connected to said first and second circuit closing conductors.

7. The construction recited in claim 1 wherein said audible signal means comprises an electromagnetic buzzer.